United States Patent Office 3,443,414
Patented May 13, 1969

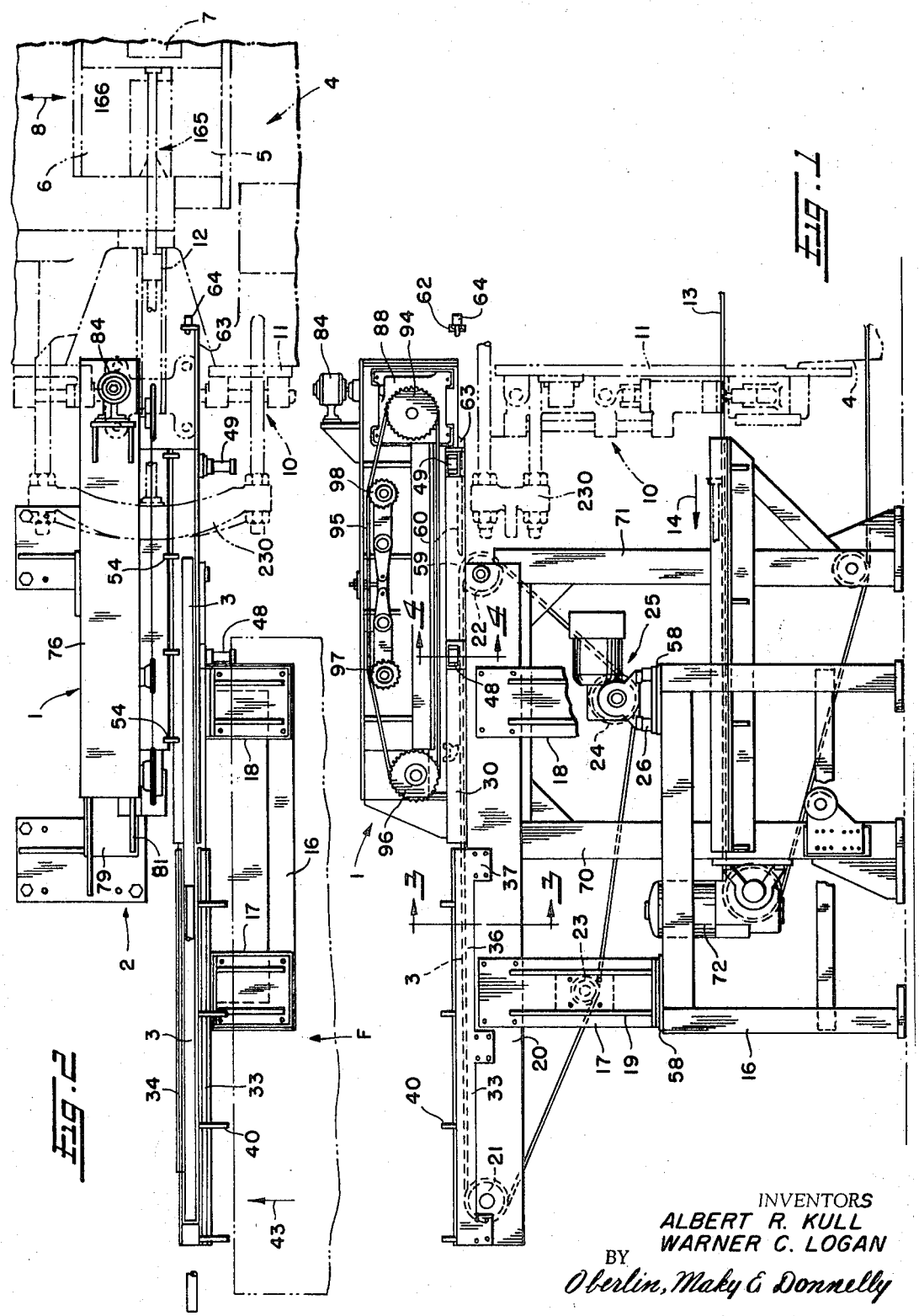

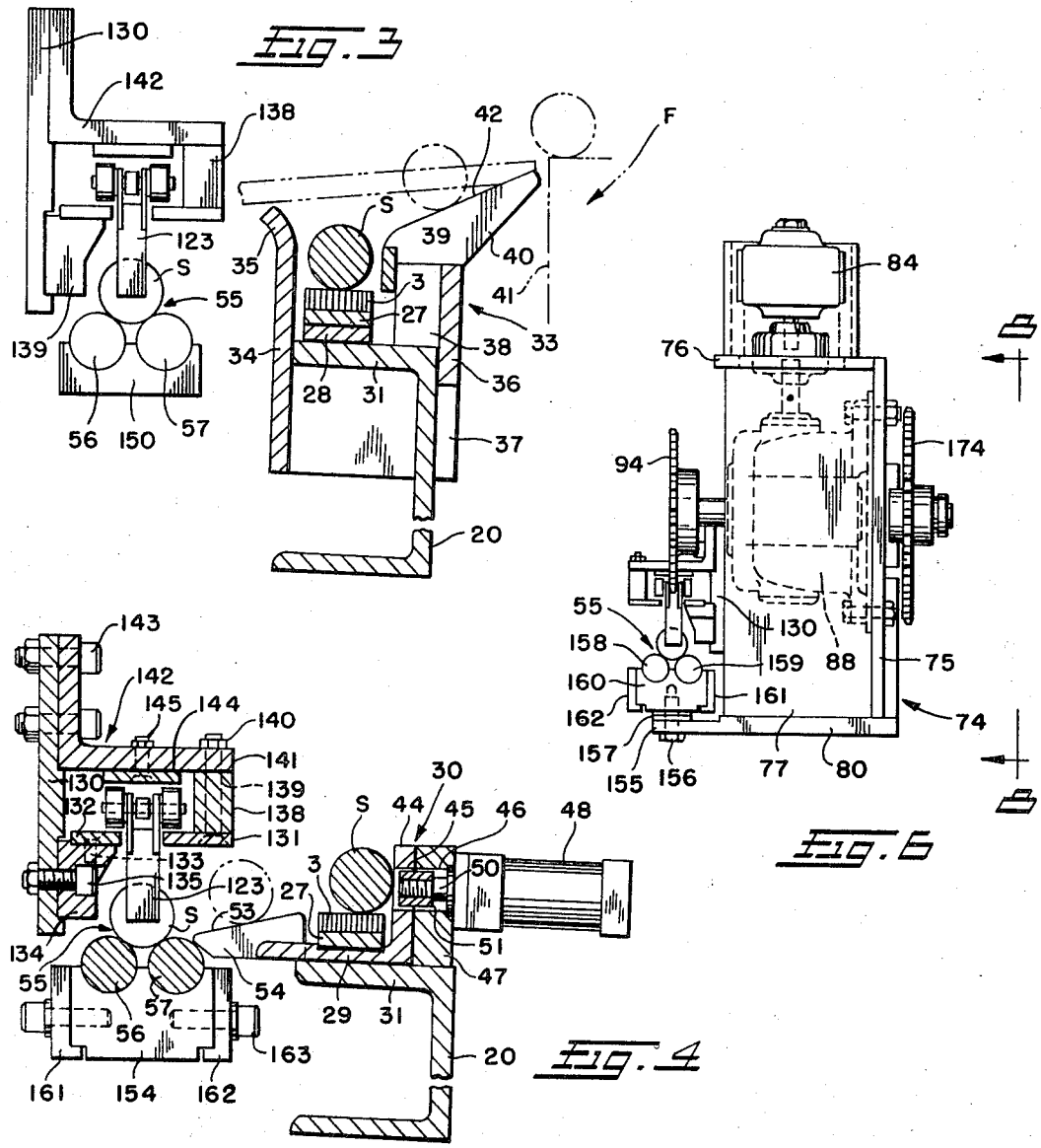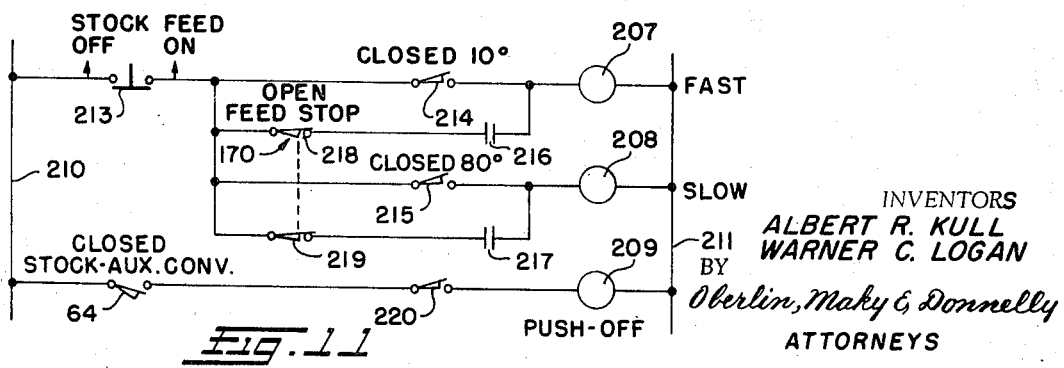

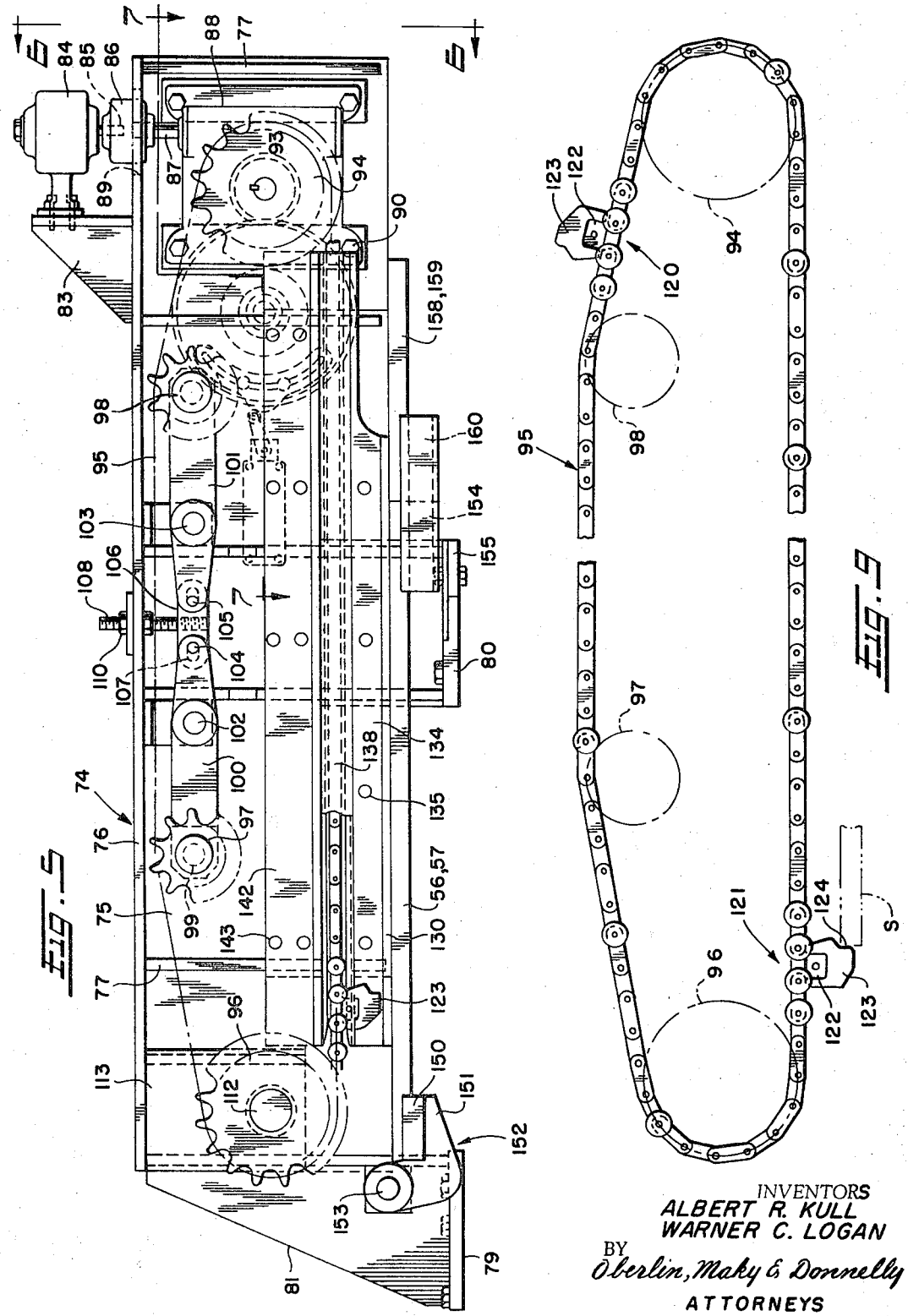

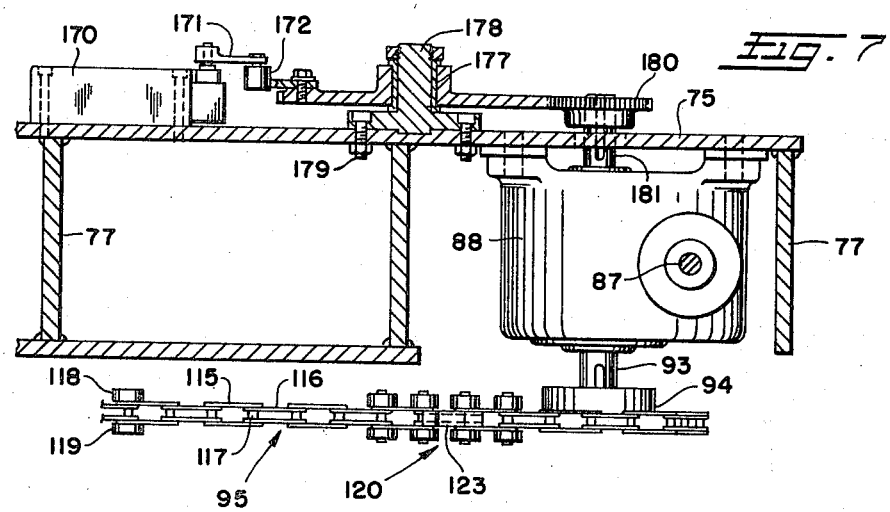
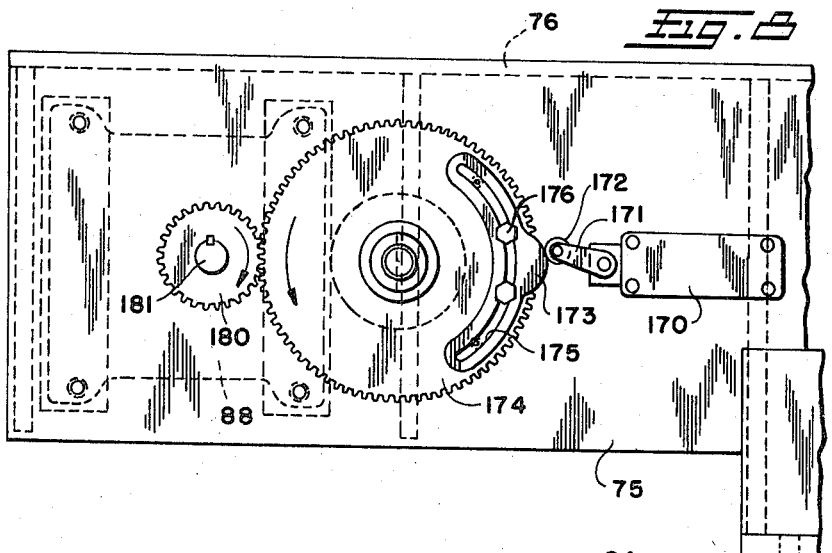
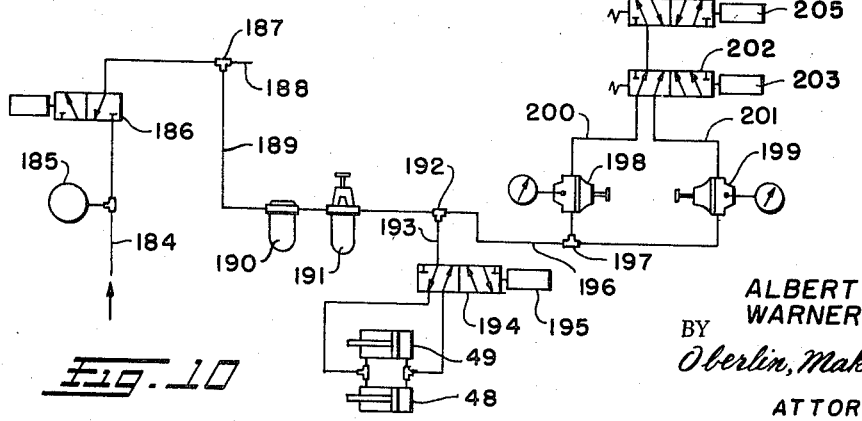

3,443,414
STOCK FEED MECHANISM
Albert R. Kull, Beachwood, and Warner C. Logan, Timberlake, Ohio, assignors to The Ajax Manufacturing Company, Euclid, Ohio, a corporation of Ohio
Filed Oct. 21, 1965, Ser. No. 499,921
Int. Cl. B21d *43/10;* B65g *47/00*
U.S. Cl. 72—422                                  19 Claims

ABSTRACT OF THE DISCLOSURE

A forging machine including a stock feed mechanism for pushing elongated stock against a stop gauge in a loading station including a single stroke pusher which moves the stock longitudinally of itself along a trough against the gauge stop, the pusher being driven by a two pressure pneumatic motor moving the stock initially at high pressure and holding the stock at low pressure in the loading position until gripped by the transfer mechanism of the forging machine.

DISCLOSURE

This invention relates generally as indicated to a stock feed mechanism and more particularly to a conveyor for feeding elongated stock longitudinally to automatic machinery for the performance of work thereon.

In the feeding of elongated stock such as bar or rod stock to automatic machinery such as forging machines, it is difficult to feed such stock repeatedly to a fast cycling machine. Moreover, the stock must oftentimes be fed to the machine from a furnace, cutter, or other stock treating device which may not precisely be synchronized with the automatic machine. Further, the feed mechanism should be capable of accommodating stock which may vary in length and yet position one end of such stock to be precisely gauged with respect to the machine.

Heretofore, reciprocating piston cylinder assemblies have been used in the longitudinal feeding of stock, but because of the return stroke required excessive energy and time is used in the feeding operation. Moreover, with such reciprocating mechanisms it is difficult to position the stock for gauging and sequence the feed mechanism in timed relation with the machine. For example, the feed mechanism should be able to position the stock for gauging as well as releasably to hold the stock to be grasped by the transfer mechanism of the machine if such machine is of the type requiring that the stock be positioned at multiple stations for the performance of work thereon.

It is accordingly a principal object of the present invention to provide a stock feed mechanism for automatic machinery which will quickly longitudinally position such stock at the proper feed position.

Another principal object is the provision of such feed mechanism which has a fast cycle of operation not requiring a return stroke.

A further object is the provision of a stock feed mechanism for forging machines and the like which will releasably hold such stock in the proper gauged position for transfer through the machine.

Another object is the provision of a feed mechanism which will convey the stock from a stock treating device such as a furnace to a machine in timed relation therewith.

Still another object is the provision of a stock feed mechanism for forging machines and the like of a simplified construction which can readily be operated in sequence with the machine fed.

A yet further object is the provision of an automatic feed mechanism for forging machines and the like utilizing a continuous stock drive device operated by a two pressure, two speed air motor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawings:

FIG. 1 is a side elevation partially broken away of a stock feed mechanism in accordance with the present invention illustrated in position to feed stock to a forging machine;

FIG. 2 is a top plan view of such stock feed mechanism as seen in FIG. 1 again showing portions of the forging machine to which the stock is fed;

FIG. 3 is an enlarged vertical section taken substantially on the line 3—3 of FIG.1 illustrating an auxiliary or furnace discharge conveyor from which the stock is received;

FIG. 4 is a vertical section similar to FIG. 3 taken substantially on the line 4—4 of FIG. 1;

FIG. 5 is an enlarged side elevation of the stock feed unit which is shown in FIG. 1;

FIG. 6 is an end elevation of such unit as seen from the line 6—6 of FIG. 5;

FIG. 7 is a horizontal section of such unit taken substantially on the line 7—7 of FIG. 5;

FIG. 8 is a plan view of the back of such unit seen in FIG. 5 as taken substantially from the line 8—8 of FIG. 6;

FIG. 9 is a broken detail elevation of the stock feed chain utilized in the unit shown in FIG. 5;

FIG. 10 is a fragmentary schematic pneumatic diagram illustrating the operation of the pneumatic components of the present invention; and FIG. 11 is a schematic wiring diagram showing the simplified manner in which the stock feed mechanism may be wired into the machine fed.

Referring now to the annexed drawings and more particularly to FIGS. 1 and 2, the stock feed mechanism shown generally at 1 is illustrated as mounted on a stand 2 in position to feed stock from an auxiliary conveyor 3 at the discharge end of a furnace or like stock treating unit to a forging machine 4. The forging machine 4 includes a stationary gripping die 5, a reciprocable gripping die 6 and a header die. Both the header die 7 and the reciprocable gripping die 6 may be driven from a crankshaft with the latter being reciprocated in the direction of the arrow 8 by a knuckle and toggle mechanism. When the stock is gripped between the gripping dies 5 and 6, the header die 7 moves toward the end of the stock held thereby to perform certain upsetting operations on the end thereof. The forging machine also includes a stock transfer mechanism 10 which may be mounted on plate 11 on the front of the machine and which includes a plurality of vertically spaced stock gripping fingers 12 alternately to grip the stock with the gripping dies to transfer the stock downwardly through the stations provided by the cavities therein. After the stock proceeds through the work stations, it is then dropped onto a discharge conveyor 13 to be moved out of the machine in the direction of the arrow 14 seen in FIG. 1. The forging machine as well as the stock transfer mechanism therefor is illustrated in greater detail in applicants' copending application Ser. No. 499,758, filed Oct. 21, 1965, entitled "Stock Transfer Mechanism."

The auxiliary conveyor 3 is mounted on a stand which includes a subframe 16 having on the top thereof stanchions 17 and 18 each of which includes a pair of triangular gusset plates 19. A channel shape beam 20 is secured to the top of the stanchions and supports at opposite ends sheaves 21 and 22 having trained thereabout the conveyor 3. Such continuous conveyor is also trained about a tensioning sheave 23 on the stanchion 17 and drive sheave 24 on the output end of gear motor drive unit 25 which is mounted on pedestal 26 projecting laterally from the top of the frame 16. The conveyor 3 may, for example, be a three-eights inch pitch silent chain approximately one and one-quarter inches wide and may be driven by the unit 25 continuously at a speed of approximately twenty-five inches per second.

Referring now additionally to FIGS. 3 and 4, it will be seen that the silent chain conveyor 3 is supported on its upper horizontal flight on rail 27 which at the entry or left hand end of the conveyor as viewed in FIG. 1 is supported on a subrail 28 and at the exit or right hand side of the conveyor as seen in FIG. 1 on the bottom flange 29 of angle 30. Of course, both the subrail 28 and the angle 30 are in turn supported on the top flange 31 of the channel-shape beam 20. At the entry end of the conveyor the stock S is laterally confined on the furnace side by an entry guide 33 of welded construction, and on the opposite side by a backstop 34 having a bent top edge 35. The entry guide 33 includes a backplate 36 having downwardly extending projections 37 which may be secured to the web of the beam 20. Blocks 38 are mounted on the backplate 36 and support guide plate 39 adjacent the top flight of the conveyor 3. Triangular guide fingers 40 project upwardly from the entry guide and serve to bridge the space between the entry guide and the end 41 of the furnace F shown in phantom lines in FIGS. 2 and 3.

The stock thus moving from the conveyor of the furnace F will then drop onto the inclined top surfaces 42 of the guide fingers 40 to roll down onto the top surface of the chain 3 and will be confined in such position by the lateral guides illustrated more clearly in FIG. 3. It is here noted that the auxiliary conveyor may be extended to the left as seen in FIG. 2 so that the discharge of two or more side-by-side furnaces may be fed to the machine 4 by the stock feed mechanism of the present invention. It is noted that the furnaces will be discharging the heated stock, usually only heated at one end, in the direction of the arrow 43.

At the exit end of auxiliary conveyor, the stock is confined only on one side by the upwardly extending flange 44 of the angle 30. It is noted that such upwardly extending flange 44 is provided with a pair of apertures 45 which are aligned with apertures 46 in blocks 47 secured to the back of the angle. Piston cylinder assemblies 48 and 49 are mounted on such blocks 47. As seen in FIG. 4, the rods 50 of such assemblies are provided with pusher blocks 51 threaded thereto and extension of the piston cylinder assemblies 48 and 49 will cause the pusher blocks to engage the stock S and roll the same laterally down the top inclined surfaces 53 of laterally projecting fingers 54 secured to the bottom flange 29 of the angle 30. The piston cylinder assemblies 48 and 49 may be termed "push-off" cylinders and function to discharge the stock from the auxiliary conveyor 3 to cause the stock to roll down into a trough 55 formed by parallel trough bars 56 and 57. It is here noted that the stanchions 17 and 18 together with the pedestal 26 for the drive unit 25 may be supported on plates or shims 58 shown in FIG. 1 which will cause the entire structure supported thereby to be canted approximately 2° from normal toward the furnace F. In this manner the cylindrical stock S is in the discharge position will be caused to roll back against the top flange 44 of the angle 30 and be held in such position by gravity until discharged by energization of the cylinder assemblies 48 and 49.

It is to be noted that the top flange 31 of the channel beam 20 as well as the bottom flange 29 of the angle 30 may be cut away as shown at 59 in FIG. 1 to accommodate the silent chain conveyor passing about the sheave 22 back to the drive unit sheave 24. Beyond such point the stock is supported on rail 60 which extends to the end of the angle 30. The leading end of the stock will be moved out onto the rail 60 by the silent chain conveyor 3 and be caused to engage stop 62 which may be mounted on bracket 63 shown broken away in FIG. 1. Engagement of the stock with the stop 62 trips limit switch 64 which will signal the proper position of the stock on the auxiliary conveyor to be discharged into the trough 55 of the feed mechanism 1. The limit switch 64 will then prepare a circuit to energize the piston cylinder assemblies 48 and 49 at the proper point in the cycle of the machine 4.

The stock feed mechanism 1 is mounted on its own stand 2 which includes legs 70 and 71 which may also support the stock discharge conveyor 13 driven by gear motor 72 mounted on the frame leg 70. The stand 2 is positioned beside the stand 16 for the auxiliary conveyor 3 but supports the feed mechanism 1 in a normal position as opposed to the slightly canted support of the auxiliary conveyor 3 afforded by the plates 58 supporting the stanchions 17 and 18 as well as the drive unit 25.

The stock feed mechanism 1 includes a box-like frame 74 having a backplate 75 and a top plate 76 with a plurality of rectangular webs 77 therebetween. The box-like frame is supported on the stand 2 by plates 79 and 80 and gusset plates as indicated at 81 may be employed to rigidify the framing.

Mounted on the top plate 76 as seen at the right hand side of FIG. 5 is a bracket 83 to which is secured air motor 84, the drive shaft 85 of which is connected by coupling 86 to the input shaft 87 of gear reducer 88. The coupling fits within aperture 89 in the top plate 76, and the gear reducer 88 may be secured by fasteners 90 to the back wall 75 of the frame 74. The output shaft 93 of the gear reducer 88 has secured thereto drive sprocket 94 for stock feed drive chain 95 trained thereabout.

The chain 95, shown in greater detail in FIG. 9, is also trained about idler sprocket 96 at the opposite end of the frame and tensioning sprockets 97 and 98. Such tensioning sprockets are journalled on shafts 99 projecting from the ends of levers 100 and 101 which are intermediately pivotally mounted at 102 and 103, respectively, to the frame 74. The inner ends of such levers are connected by pins 104 and 105 to adjusting block 106 by means of elongated slots 107. The block 106 is mounted on an adjusting screw 108 and may be moved vertically thereby and locked in the selected position of vertical adjustment by nuts 110. It is to be noted that downward movement of the block 106 will elevate the sprockets 97 and 98 a distance substantially greater than the movement of the block. In this manner the chain 95 may be maintained at the proper desired tension.

The end sprocket 96 is journalled on shaft 112 which extends through plate 113 mounted on the face of the frame 74. The sprocket 96 may, for example, have a five-eights inch pitch with thirty teeth, the same as drive sprocket 94, and the tensioning sprockets 97 and 98 may have a five-eighths inch pitch with seventeen teeth. The chain 95 as seen in more detail in FIG. 9 may have a one and one-quarter inch pitch and eighty-two five-eights inch double pitch links.

As seen in FIG. 7, the chain 95 generally may include conventional pairs of outside links 115 and inside links 116 pin connected together with spacing rollers 117 surrounding bushings on such pins. However, for the most part of the length of the chain, every sixth pin may be extended and large diameter rollers 118 and 119 mounted thereon on the otuside of the chain.

At diametrically opposite positions on the chains four successive pins are provided with such outside large diameter rollers as indicated at 120 and 121 in FIG. 9, and accordingly at such positions in the chain there will be a total of eight such rollers. The intermediate inside links in such roller groupings may each include offset portions 122 between which are pin connected lugs or dogs 123 provided with recesses 124 adapted to engage behind the trailing ends of the stock S to push the same along the trough formed by the guide rods 56 and 57.

As seen more clearly in FIGS. 4 and 6, the front of the frame 74 has secured thereto a mounting plate 130 to which guides are secured confining the path of the chain 95 in its lower horizontal flight. Such guides include as seen in FIG. 4 a right wear plate 131 and a left wear plate 132 which are laterally spaced to form in effect a guide slot therebetween accommodating the dogs 123 which will then project downwardly therethrough to engage the end of the stock S supported in the guide trough 55. Fasteners such as flathead socket cap screws 133 may be employed to hold the left wear plate to elongated support 134 held to the mounting plate by fasteners 135.

The right wear plate 131 is pendantly supported beneath elongated spacer 138 with flathead socket cap screw fasteners 139 and lock nuts 140 securing both the right wear plate 131 and the spacer 138 to the outer end of the lower flange 141 of angle 142. The angle is secured to the mounting plate 130 by fasteners 143 extending through the upwardly extending flange thereof. A top wear plate 144 is secured to the flange 141 of the angle 142 by means of flathead socket cap screw and lock nut fasteners 145. It can now be seen that the top wear plate or rail 144 straddles the slot or passage between the right and left hand rails 131 and 132 providing slight clearance for the rollers 118 and 119 guiding the chain and thus the dogs 123 in the horizontal bottom flight of the chain.

As seen in FIG. 5 the guide rods 56 and 57 forming the trough 55 may be supported at the outboard end by a spacer block 150 having semi-circular parallel elongated recesses in the top surface thereof which is in turn supported on the arm 151 of member 152 pivoted at 153 to the outer end of the frame 74. The guide rods 56 and 57 are also supported by a similar spacer block 154 seen in FIGS. 4 and 6 which may be secured to projection 155 of the plate 80 by fastener 156 and shims 157 may be employed to position the spacer block 154 at the desired elevation. Depending on the length of the stock being fed, extension rods 158 and 159 may be secured to a further spacer block 160 which is supported adjacent the spacer block 154 by means of the L-shape side plates 161 and 162 held to the blocks by fasteners 163 at each side thereof.

In any event the bars 56, 57, 158 and 159 forming the trough 55 can be positioned so that the stock supported thereon will be fed axially by the dogs 123 into the top load station 165 in the gripping dies 6 and 5 shown in FIG. 2 and be caused to abut against a gauge stop plate 166.

Referring now to FIGS. 7 and 8, the back wall 75 of the frame 74 has mounted thereon a feed stop limit switch 170 actuated by arm 171 having roller 172 thereon adapted to engage cam 173 which may be adjustably mounted on timing gear 174. The cam is provided with an arcuate slot 175 concentric with the timing gear and clamp fasteners 176 may be employed to hold the cam adjustably in the desired position. The timing gear is mounted on bushing 177 on stud 178 which is secured to the backplate 75 by fasteners 179. The timing gear 174 is in mesh with timing pinion 180 mounted on rearward extension 181 of the shaft 93 of the gear reducer 88. The pinion 180 and the gear 174 are so designed that the timing gear 174 will rotate one complete revolution for every half complete revolution of the chain 95. The feed chain timing pinion 180 may, for example, have sixty teeth while the timing gear 174 has a total of one hundred sixty-four teeth. It will, of course, be appreciated that three equally spaced dogs may be employed on the chain 95 and the gear and pinion timing the chain may then be designed to actuate the switch 170 for every complete one-third revolution of the chain, and so forth.

Referring now to FIG. 10, it will be seen that pneumatic pressure for operating the stock feed mechanism may be supplied from a source 184 through pressure switch 185 and manually operated shutoff valve 186 to T 187. The branch 188 of the T may be connected to the stock feed mechanism of the forging machine as is shown in greater detail in applicants' aforementioned copending application filed even date herewith. The other branch 189 of the T leads to an air filter 190 and a lubricator 191 and to further T 192. The branch 193 provided by the T 192 leads to single solenoid four-way spring return valve 194 operated by "push-off" solenoid 195. In the deenergized position of such valve air is supplied to the rod ends of the push-off cylinders 48 and 49 to retract the same, and in the energized position air will be supplied to the blind ends to extend such push-off cylinders.

The line 196 from the T branches at T 197 and is thus connected to pressure regulators 198 and 199 in parallel lines 200 and 201 leading to different ports of single solenoid four-way spring return valve 202 which is operated by "slow-feed" solenoid 203. The valve 202 is connected in series to single solenoid four-way spring return valve 204 operated by "fast-feed" solenoid 205. The pressure regulators 198 and 199 may have a range from 0 to 125 p.s.i. and the regulator 198 may be set at about 85 p.s.i. while the regulator 199 is set at about 40 p.s.i. It can now be seen that air may be supplied to the motor 84 through the high pressure regulator by energization of the solenoid 205 shifting valve 204 and through the low pressure regulator 199 by energizing both solenoids 203 and 205 to shift the valves 202 and 204, respectively.

Referring now to FIG. 11, it will be seen that the solenoids 205, 203 and 195 may be operated by relays 207, 208 and 209, respectively. The relays may be connected between mains 210 and 211 of the control circuit of the machine 4 and the fast and slow speed solenoids are controlled through a manually operated selector switch 213 and rotary cam limit switch contacts 214 and 215 for the relays 207 and 208, respectively. The contacts 214 and 215 may be operated by cams driven from the crankshaft of the machine 4. The closing of contacts 214 energizes relay 207 which energizes the solenoid 205 and also closes holding switch contacts 216. The closing of contacts 215 energizes the relay 208 to energize solenoid 203 and also to close contacts 217 holding the relay energized. The holding contacts 216 and 217 permit the cam switches 214 and 215 to open after energizing the relays without deenergizing such relays. The motor 84 is deenergized by the opening of the contacts 218 and 219 of the limit switch 170 which is tripped by the position of the chain 95.

The relay 209 energizing the push-off cylinder assemblies 48 and 49 through the solenoid 195 is energized by a rotary cam limit switch 220 which may, like the switches 214 and 215, be operated at the desired point of rotation of the main crankshaft of the machine 4. However, before the switch 220 can energize the push-off relay 209, the limit switch 64 must be closed signalling that the stock S on the auxiliary conveyor has been moved to the push-off position.

Operation

Heated stock from the furnace F or furnaces which may be side-by-side not precisely synchronized with the forging machine 4 is discharged onto the inclined top surface 42 of the rails or guides 40 to roll down into the chute formed by the guides 33 and 34 onto the constantly moving auxiliary conveyor 3. The conveyor 3 then moves the stock to the discharge end thereof and the leading end of the stock will engage the stop 62 and trip limit switch 64 preparing the control circuit to the relay operating the push-off cylinder assemblies 48 and 49. The conveyor 3, of course, runs canted approximately 2° from vertical to assure that the stock will not roll off the open side at the discharge end.

At the proper cycle time of the forging machine 4, the switch 220 is closed and the relay 209 energizes solenoid 195 to cause the piston cylinder assemblies 48 and 49 to extend pushing the stock down the inclined top surfaces 53 of the rails or fingers 54 into the trough 55 formed by the guide bars 56 and 57. If the stock S is not in proper position to be discharged in that the limit switch 64 has not been closed, the push-off cylinders 48 and 49 will not be actuated.

The stock feed chain 95 in the illustrated embodiment has two pusher dogs 123 which are located 180° from each other on the chain, and when one pusher dog has completed its stock feed stroke, the other will be at the proper position for the next piece of stock S. When the stock has been pushed into the feed trough as shown in FIG. 4 by the push-off cylinder assemblies, the closing of contacts 214 will energize relay 207 energizing fast-feed solenoid 205 to shift the valve 204 to supply air at approximately 85 p.s.i. through the line 200 directly to the air motor 84 causing the chain to be driven in a counterclockwise direction as viewed in FIGS. 5 and 9 and, of course, causing the prepositioned dog 123 to engage the rear end of the stock to push the same at fast speed along the trough 55.

At approximately the half-way point in the feed stroke of the chain, the contacts 215 will be closed now energizing relay 208 to energize solenoid 203 to shift valve 202 to supply air to the motor 84 from line 201 at the reduced pressure provided by the regulator 199. The low pressure on the air motor 84 now completes the feed stroke pushing the stock S against the gauge plate 166 in the back of the load station 165 at the top of the gripping dies 5 and 6. Since the trailing end of the stock will still be beneath the bottom horizontal flight of the chain, the stock will be held releasably against the stock gauge 166 by the feed chain dog which is still urged toward the completion of its stroke by the low pressure on the air motor 84. With the stock thus in the load position and urged against the gauge 166, the transfer fingers 12 of the transfer mechanism 10 will now grip the stock and move it horizontally away from the stationary gripping die 5 and, of course, laterally out of the path of the dog 123. The chain 95 now moves under the low pressure to the completion of its stroke and will be stopped by the tripping of limit switch 170 opening contacts 218 and 219 simultaneously to deenergize relays 207 and 208. In the meantime another piece of heated stock S may be positioned on the auxiliary conveyor 3 and moved against the stop 62 to trip the limit switch 64 and signal its position ready to be pushed off onto the feed trough 55 at the proper point in the operation of the machine 4. As the stock is moved laterally by the transfer fingers, a limit switch positioned on backstop 230 mounted on the front of the machine 4 may detect a piece of stock which has not for some reason been fed completely into the load station and stop the machine.

It can now be seen that there is provided a simplified fast acting stock feed mechanism for forging and like machines which will rapidly feed stock into position for the performance of work thereon.

Other modes of applying the principles of the invention may be employed, change being made as regards the details described, provided the features stated in any of the following claims or the equivalent of such be employed.

We, therefore, particularly point out and distinctly claim as our invention:

1. A stock feed mechanism for forging machines and the like comprising a guide trough aligned with the loading station of such machine, means operative to deposit such stock on such trough, single stroke unidirectional pusher means operative to move such stock along said trough into such loading station, and drive means operative to move said pusher means thus to move such stock into such loading station, hold such stock in such loading station, and complete such single stroke after the machine has removed such stock from the loading station.

2. A stock feed mechanism as set forth in claim 1 wherein said single stroke pusher means comprises a dog projecting toward said guide trough, and means supporting said dog for movement substantially parallel to said trough.

3. A stock feed mechanism as set forth in claim 2 wherein said means supporting said dog for movement substantially parallel to said trough comprises a continuous flexible element, and guide means for said element extending substantially parallel to said guide trough.

4. A stock feed mechanism as set forth in claim 3 wherein said drive means comprises an air motor operative to drive said continuous flexible element.

5. A stock feed mechanism as set forth in claim 1 wherein said drive means comprises a pneumatic motor operative to drive said single stroke pusher means, and pressure means to operate said drive means at high pressure during the initial portion of the single stroke, and at low pressure during the latter portion of such stroke.

6. A stock feed mechanism as set forth in claim 1 wherein said means operative to deposit such stock on such trough comprises an auxiliary conveyor substantially parallel thereto, and push-off means operative laterally to move such stock from said auxiliary conveyor to said guide trough.

7. A stock feed mechanism for forging machines and the like comprising a guide trough aligned with the loading station of such machine, pusher means operative to move such stock along said trough into such loading station, and dual pressure drive means operative to move said pusher means initially at high pressure thus to move such stock toward such loading station, and then at low pressure to complete movement of such stock to such loading station and hold such stock releasably therein.

8. A stock feed mechanism for feeding elongated stock longitudinally of itself comprising a continuous drive element, at least two pushers projecting from said drive element operative to engage behind such stock, said pushers being equally spaced along said element, and air motor means operative to move said drive element thus to move said pushers and longitudinally move such stock.

9. A stock feed mechanism as set forth in claim 8 wherein said continuous drive element comprises a chain, a guide trough for supporting such stock, and guide means for said chain operative to maintain said chain substantially parallel to said trough during a portion of the flight thereof.

10. A stock feed mechanism as set forth in claim 8 including pressure means operative to drive said air motor initially at high pressure and then at low pressure.

11. A stock feed mechanism as set forth in claim 8 including means responsive to the position of said pushers operative to deenergize said air motor.

12. A stock feed mechanism as set forth in claim 8 wherein said continuous drive element comprises a chain, means supporting said chain during a portion of its movement substantially parallel to the longitudinal axis of such stock, a drive sprocket for said chain driven by a speed reducer, said air motor being coupled to said speed reducer.

13. In a forging machine of the type comprising a stationary gripping die and a reciprocable gripping die operative to grip elongated stock therebetween, a header die operative to engage the end of such stock thus gripped by said gripping dies, a loading station in such gripping dies having a gauge stop, and stock feed mechanism operative longitudinally to position such stock in said loading station against said stop comprising a continuous drive element, a dog projecting from said drive element operative to engage behind such stock, and pneumatic motor means operative to move said drive element unidirectionally intermittently thus to move said dog longitudinally to move such stock into said loading station.

14. A forging machine as set forth in claim 13 including means responsive to the cyclic operative position of such dies to energize said pneumatic motor means.

15. A forging machine as set forth in claim 14 including means responsive to the cyclic operative position of such dies to reduce the pressure of said pneumatic motor means to complete movement of such stock into such loading station and releasably to hold such stock therein until removed by said machine.

16. A forging machine as set forth in claim 15 including means responsive to the position of said dog operative to deenergize said motor means.

17. A forging machine as set forth in claim 13 including an auxiliary conveyor adapted to feed stock from a furnace or like stock treating mechanism to said stock feed mechanism, and means responsive to the operation of said machine operative to shift such stock from said auxiliary conveyor to said stock feed mechanism.

18. Conveyor means operative to move elongated stock axially comprising a guide support for such stock, a continuous chain including rollers thereon, means operative to support and guide said chain for movement substantially parallel to the axis of such work, dog means projecting from said chain operative to engage the end of such work and axially move the same, and pneumatic motor means operative to drive said chain unidirectionally intermittently to cause said dog means axially to move such work.

19. Conveyor means as set forth in claim 18 including at least two dog means projecting from said chain and being equally spaced therealong, and means responsive to the movement of said chain a distance equal to the distance between said dog means operative to stop said chain.

References Cited
UNITED STATES PATENTS

| | | | |
|---|---|---|---|
| 2,503,761 | 4/1950 | Murray et al. | 51—103 |
| 2,674,779 | 4/1954 | Herzog | 214—1.5 |
| 1,876,252 | 9/1932 | Lehman | 198—23 |
| 1,877,111 | 9/1932 | Wunderlich | 72—421 X |
| 1,904,613 | 4/1933 | Braren | 198—34 |
| 1,914,806 | 6/1933 | Hormel | 72—422 X |
| 3,082,859 | 3/1963 | Hagner et al. | 198—135 |
| 3,162,294 | 12/1964 | Dieter | 198—34 |
| 3,183,533 | 5/1965 | Kull | 198—135 X |

CHARLES W. LANHAM, *Primary Examiner.*

E. SUTTON, *Assistant Examiner.*

U.S. Cl. X.R.

10—12; 198—23; 214—1.5